United States Patent
Nevet et al.

(10) Patent No.: US 9,794,542 B2
(45) Date of Patent: Oct. 17, 2017

(54) SECURE WEARABLE COMPUTER INTERFACE

(71) Applicant: Microsoft Technology Licensing, LLC, Redmond, WA (US)

(72) Inventors: Amir Nevet, Haifa (IL); Giora Yahav, Haifa (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 30 days.

(21) Appl. No.: 14/322,927

(22) Filed: Jul. 3, 2014

(65) Prior Publication Data

US 2016/0007007 A1  Jan. 7, 2016

(51) Int. Cl.
| | | |
|---|---|---|
| *G06F 7/04* | (2006.01) | |
| *G06K 9/46* | (2006.01) | |
| *H04N 13/02* | (2006.01) | |
| *G06K 9/00* | (2006.01) | |
| *G06F 3/00* | (2006.01) | |
| *G06F 3/01* | (2006.01) | |
| *G06F 21/32* | (2013.01) | |

(Continued)

(52) U.S. Cl.
CPC ......... *H04N 13/0203* (2013.01); *G06F 3/005* (2013.01); *G06F 3/011* (2013.01); *G06F 3/017* (2013.01); *G06F 21/32* (2013.01); *G06F 21/35* (2013.01); *G06K 9/00221* (2013.01); *G06K 9/00288* (2013.01); *G06K 9/00335* (2013.01); *G06K 9/00369* (2013.01); *G06K 9/00617* (2013.01); *H04W 12/08* (2013.01); *G06T 2207/10012* (2013.01); *G06T 2207/10028* (2013.01); *G06T 2207/30201* (2013.01); *H04L 63/0861* (2013.01)

(58) Field of Classification Search
CPC ...... G06F 3/04815; G06F 3/005; G06F 3/011; G06F 3/017; G06F 21/32; G06F 21/35; H04N 13/0203; G06K 9/00221; G06K 9/00288; G06K 9/00335; G06K 9/00369; G06K 9/00617; H04W 12/08; H04L 63/0861
USPC ......................................................... 726/19
See application file for complete search history.

(56) References Cited

U.S. PATENT DOCUMENTS

| | | | |
|---|---|---|---|
| 8,408,706 B2 | 4/2013 | Yahav | |
| 2004/0139330 A1* | 7/2004 | Baar | G06F 3/0481 |
| | | | 713/182 |

(Continued)

FOREIGN PATENT DOCUMENTS

| | | |
|---|---|---|
| EP | 2657886 A2 | 10/2013 |
| WO | 9925152 A2 | 5/1999 |

OTHER PUBLICATIONS

"International Search Report and Written Opinion Issued in PCT Application No. PCT/US2015/038924", dated Sep. 17, 2015, 11 Pages.

(Continued)

*Primary Examiner* — Dede Zecher
*Assistant Examiner* — Abdullah Almamun
(74) *Attorney, Agent, or Firm* — A.C. Entis-IP Ltd.

(57) ABSTRACT

A wearable computer interface comprising a three dimensional (3D) range camera and a picture camera that image the user and a controller that process the images to identify the user and determine if the user is authorized to use the interface to access functionalities provided by a computer interfaced by the interface.

20 Claims, 3 Drawing Sheets

(51) Int. Cl.
  *G06F 21/35* (2013.01)
  *H04W 12/08* (2009.01)
  *H04L 29/06* (2006.01)

(56) References Cited

U.S. PATENT DOCUMENTS

| | | | | |
|---|---|---|---|---|
| 2005/0270386 | A1* | 12/2005 | Saitoh | G06K 9/00604 348/239 |
| 2005/0286767 | A1* | 12/2005 | Hager | G06K 9/00208 382/190 |
| 2006/0097172 | A1* | 5/2006 | Park | G01J 3/36 250/338.1 |
| 2008/0002866 | A1 | 1/2008 | Fujiwara | |
| 2008/0170776 | A1* | 7/2008 | Albertson | G06F 21/35 382/154 |
| 2010/0141787 | A1* | 6/2010 | Bigioi | G06K 9/00288 348/222.1 |
| 2010/0169792 | A1* | 7/2010 | Ascar | G06F 11/3414 715/744 |
| 2010/0189305 | A1 | 7/2010 | Capless | |
| 2010/0199232 | A1 | 8/2010 | Mistry et al. | |
| 2012/0202508 | A1* | 8/2012 | Toth | H04W 4/00 455/450 |
| 2013/0178287 | A1 | 7/2013 | Yahav | |
| 2013/0279763 | A1 | 10/2013 | Wang et al. | |
| 2013/0307842 | A1 | 11/2013 | Grinberg et al. | |
| 2014/0342665 | A1* | 11/2014 | Amano | H04W 52/0229 455/41.1 |

OTHER PUBLICATIONS

Loclair, et al., "PinchWatch: A Wearable Device for One-Handed Microinteractions", In Proceedings of 12th International Conference on Human Computer Interaction with Mobile Devices and Services, Sep. 7, 2010, 4 pages.

Lo, et al., "Augmediated Reality System Based on 3D Camera Selfgesture Sensing", In Proceedings of IEEE International Symposium on Technology and Society, Jun. 27, 2013, pp. 20-31.

Ahmad, et al., "UbiHand: A Wearable Input Device for 3D Interaction", In Proceedings of ACM SIGGRAPH Research posters, Article No. 159, Jul. 30, 2006, 1 page.

"Metaio to integrate 3D Augmented Reality into Intel® RealSense™ Computing SDK", Published on: Jan. 6, 2014 Available at: http://www.prnewswire.com/news-releases/metaio-to-integrate-3d-augmented-reality-into-intel-realsense-computing-sdk-238960841.html.

Poongodi, M., "Sixth Sense Technology", In Proceedings of International Journal of Engineering, Computer Science and Technology, Mar. 2012, pp. 9-20.

Second Written Opinion Issued in PCT Application No. PCT/US2015/038924, dated May 23, 2016, 7 Pages.

"International Preliminary Report on Patentability Issued in PCT Application No. PCT/US2015/038924", dated Sep. 20, 2016, 8 Pages.

\* cited by examiner

SECURE WEARABLE COMPUTER INTERFACE

TECHNICAL FIELD

Embodiments of the invention relate to a wearable computer interface.

BACKGROUND

Mobile communication and computing devices, such as mobile phones, tablets, e-readers, laptops, and personal digital assistants, have proliferated and penetrated human civilization at dizzying speed. Today, substantially all cultures, spanning the gamut from technologically unsophisticated societies to societies at the cutting edge of today's science and technology, are intimately familiar with mobile communication/computing equipment. In the year 2013 alone, about 1.8 billion mobile phones, of which 1 billion mobile phones were smartphones, were shipped to consumers by manufacturers—an astonishing, approximately 2 mobile phones for every man, woman, and child on the planet. In the same year, an additional 500 million tablets and laptops were sold. And communication/computing devices, hereinafter generically referred to as computers, are fast morphing into a plethora of different forms that make them easier to use and carry, and even more intimately part of everyday life. Computers are being configured as wearable accessories such as glasses, watches and armbands, and are being integrated into clothing.

The ubiquity of computers in all their new and various forms, and their associated accessories and mobile applications, "Apps", and the increase in world population and resultant density have eroded personal and collective privacy to a degree that maintaining and protecting a modicum of quiet, privacy, and confidentiality, has become a nagging, headline making worry. For example, inadvertent visual eavesdropping of a laptop, tablet, wrist or hand computer screen by a crowded neighbor in a subway, on a bus, in an airplane or shopping mall is an often frequent breach of a person's personal zone of privacy that if at all possible, may require substantial dexterous fidgeting to avoid.

SUMMARY

An aspect of an embodiment of the invention relates to providing a wearable computer interface that operates to provide and protect a zone of privacy for a user. In an embodiment, the computer interface operates to determine if a user is facing the interface, and if so to determine an identity for the user. If the determined identity is that of a user authorized to access functionalities provided by a computer that the interface interfaces, the interface enables the user access to the functionalities. Optionally, the interface sustains access substantially only as long as the user is facing and watching the interface, hereinafter also referred to as a "Watch-It interface" or simply "Watch-It".

In an embodiment of the invention, "Watch-It", comprises a three dimensional (3D) camera system controllable to acquire 3D range images of a scene in the field of view (FOV) of the camera system and optionally, a contrast image, hereinafter also referred to as a "picture image" or "picture" of the scene. The 3D range image provides 3D spatial coordinates for features of the scene. The picture image provides pictures that may be used to identify the features and characteristics of the features. Optionally, Watch-It and the 3D camera system are normally OFF and Watch-It repeatedly turns ON, periodically or intermittently, to use the 3D camera system to image its environment and process images acquired by the 3D camera system to determine if a user is in the FOV and facing Watch-It. Optionally, Watch-It comprises an accelerometer and turns ON to image its environment responsive to signals generated by the accelerometer indicating motion that brings Watch-It to face a user. If Watch-IT determines it is being "watched" by a user, Watch-It processes images of the user provided by the 3D camera system to determine an identity for the user. If the identity is that of a user authorized to access functionalities of the computer that Watch-It interfaces, Watch-It enables the user access to the functionalities.

Optionally, Watch-It comprises a video screen and may display substantially only a screen saver on the screen or maintain the screen blank until Watch-It has determined that it is being watched by an authorized user. Upon making such a determination Watch-It may generate an interactive display on the screen for the user's use. A solid angle of the FOV of the Watch-It 3D camera system and a depth of field of the FOV define a zone of privacy that Watch-It provides the user. In an embodiment, the solid angle and/or depth of field are adjustable to adapt the FOV and thereby the zone of privacy to the authorized user's preferences and/or needs. In an embodiment Watch-It comprise a privacy filter that operates to shield images displayed on the Watch-It screen from visual prying.

In an embodiment of the invention, Watch-It is configured to acquire a voiceprint of speech vocalized by a user and processes images provided by the 3D camera system to identify words such as a password or passphrase, in the voiceprint that the user may be expected to voice to gain access to the functionalities and/or to interact with the computer. In an embodiment of the invention the 3D camera system images the users' face simultaneously with the user vocalizing the speech in the voiceprint, and processes the images to lip-read the user to aid in identifying the words.

In an embodiment of the invention, the Watch-It interface is comprised in a device worn on the arm or wrist that may have a form similar to that of a wrist watch. Optionally, the Watch-It is worn on the leg to enable a user to use the interface when seated. The computer may be any of various computing devices and/or processors with which Watch-It may communicate to interface a user. The computer may, by way of example, comprise any one, or combination of more than one of a smartphone, laptop, notebook, PC, personal digital aid (PDA), chipset, and application specific integrated circuit (ASIC). Optionally, Watch-It and the computer that the interface interfaces with a user are integrated in a same wearable device.

In the discussion, unless otherwise stated, adverbs such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended. Unless otherwise indicated, the word "or" in the specification and/or claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same numeral in all the figures in which they appear. A label labeling an icon or other graphical indicia representing a given feature of an embodiment of the invention in a figure may be used to reference the given feature. Dimensions of components and features shown in the figures are chosen for convenience and clarity of presentation and are not necessarily shown to scale.

DETAILED DESCRIPTION

Figure 1A:
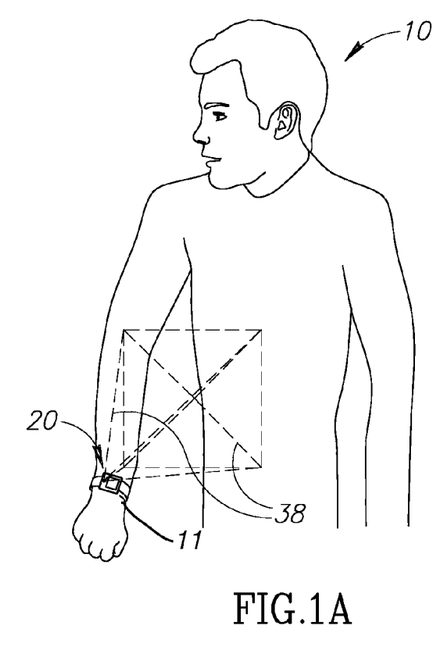
FIG. 1A schematically shows a user wearing a Watch-It having a form similar to that of a wrist watch, in accordance with an embodiment of the invention.
Figure 1B:
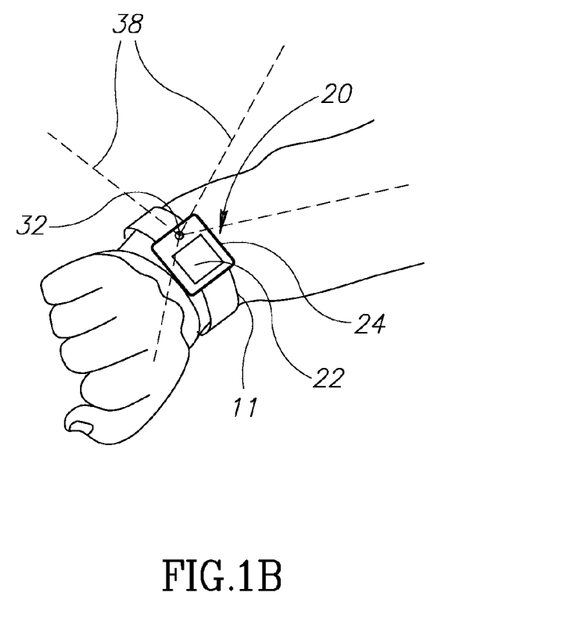
FIG. 1B schematically shows the Watch-It shown in FIG. 1A greatly enlarged for convenience in viewing details of Watch-It in accordance with an embodiment of the invention.
Figure 1C:
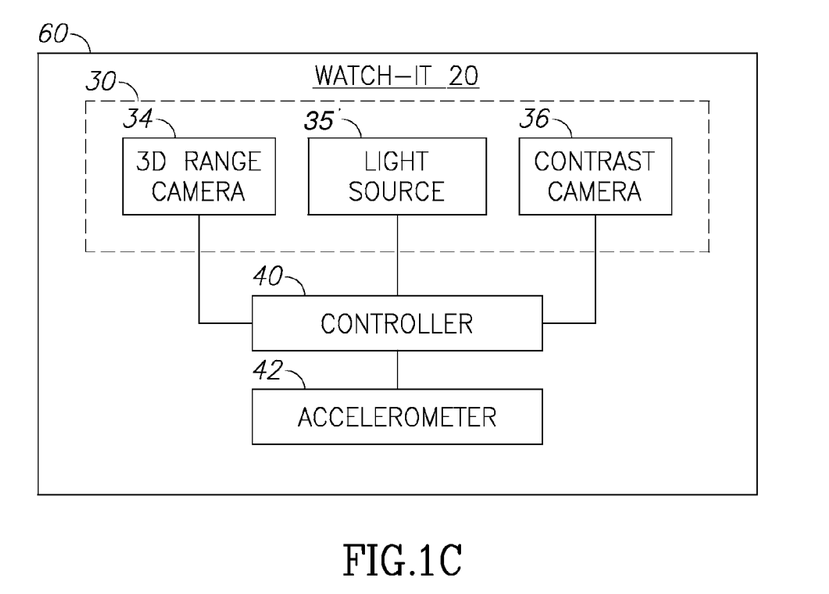
FIG. 1C shows a block diagram of components of Watch-It, in accordance with an embodiment of the invention.

FIG. 1A schematically shows a user 10 wearing a Watch-It 20 having a form of a wrist watch, in accordance with an embodiment of the invention. FIG. 1B schematically shows an enlarged image of Watch-It 20 shown in FIG. 1A, and FIG. 1C shows a block diagram 50 of components that Watch-It 20 may comprise, in accordance with an embodiment of the invention. In FIG. 1A the user's wrist 11 on which Watch-It is worn, is down alongside the user's body and the user is not looking at Watch-It.

Watch-It 20 optionally comprises a display screen 22 for interacting with user 10 and a 3D camera system 30 shown in block diagram 60 (FIG. 1C) of which only an optical aperture 32 on a face 24 of Watch-It is shown in FIGS. 1A and 1B. Display screen 22 may be covered by a suitable diffractive or dispersive privacy screen (not shown) to limit a viewing cone of screen 22 and protect Watch-It 20 from visual prying. 3D camera system 30 as schematically shown in block diagram 60 comprises a 3D range camera 34 and a picture camera 36. 3D camera system 30 has a field of view (FOV) schematically outlined in FIGS. 1A and 1B by dashed lines 38 and may be referenced below as FOV 38. 3D range camera 34 acquires a range image of a scene in FOV 38 and picture camera 36 acquires contrast images, pictures, of the scene in the FOV. A range image acquired by 3D range camera 34 provides 3D spatial coordinates for features in the scene. A picture of the scene acquired by picture camera 36 provides pictures of the features that may be used to identify the features. A controller 40 (FIG. 1C) controls operation of Watch-It 20 and 3D camera system 30 and processes images provided by 3D range camera 34 and/or picture camera 36 in the 3D camera system to identify users that may be imaged in the images as described below.

3D range camera 34 may be any suitable 3D range camera, and may for example comprise a time of flight (TOF) 3D camera or a stereoscopic triangulation 3D camera. A TOF-3D camera may determine a "round trip time" that it takes a pulse of light to make a round trip from the TOF-3D camera to a feature in a scene imaged by the camera and back to the camera to determine a distance to the feature. A stereoscopic triangulation 3D camera acquires a stereoscopic image of a feature in a scene that comprises images of the feature from two different viewpoints and determines distance to the feature from a disparity in the locations of the image of the feature in the images.

3D range camera 34 comprised in Watch-It 20 is assumed, by way of example, to be a TOF 3D range camera. Watch-It 20 comprises an IR (infrared) light source 35 that controller 40 controls to transmit relatively short IR light pulses to illuminate a scene in FOV 38 of 3D camera system 30. For each transmitted light pulse, controller 40 shutters 3D range camera 34 ON and OFF for a corresponding short exposure period responsive to a transmission time of the IR light pulse to image light that the features reflect from the light pulse back to 3D range camera 34. Controller 40 determines round trip times and distances to the features responsive to the imaged light. Picture camera 36 acquires images of the scene responsive, optionally, to ambient IR light and/or IR light reflected by features in the scene from IR light pulses generated by light source 35. Optionally picture camera 36 acquires images of the scene responsive to visible light.

Whereas block diagram 60 of Watch-It in FIG. 1C indicates that 3D camera system 30 comprises a 3D range camera that is separate from a picture camera, in an embodiment, Watch-It 20 may comprise a same, multipurpose camera that is controlled by controller 40 to function as a TOF-3D range camera and a picture camera. Controller 40 may operate the multipurpose camera as a TOF-3D range camera to determine distances to features in a scene by controlling light source 35 to transmit short IR light pulses to illuminate the scene and shuttering the multipurpose camera ON and OFF for appropriately timed corresponding exposure periods. Controller 40 may operate the multipurpose camera as a picture camera by imaging the scene during a relatively long exposure period to image light from a plurality of IR light pulses transmitted by light source 35, ambient IR light, or visible light.

In an embodiment, the multipurpose camera may comprise first and second photosensors and substantially simultaneously acquire a range image and a picture image of a scene by imaging light reflected by features in the scene from, optionally, same light pulses on the first and second photosensors respectively. The first and second photosensors may share same optics that collect light reflected by features of the scene from light pulses transmitted by light source 35 and direct first and second portions of the light reflected from each light pulse to the first and second photosensors respectively. Controller 40 may shutter ON and OFF the first photosensor for a corresponding short exposure period for each IR light to image the first portion of the light from the light pulse on the first photosensor to acquire a round trip time for the light pulse. The controller may shutter ON and OFF the second photosensor for a relatively long exposure period to image the second portions of a plurality of the light pulses on the second photosensor to acquire a picture image of the scene.

In an embodiment, controller 40 maintains Watch-It 20 in a default dormant state in which operation of Watch-It is characterized by relatively small energy consumption and 3D camera system 30 is OFF. In the default, dormant state, controller 40 may generate a screen saver display on screen 22 or maintain the screen blank. Controller 40 may, periodically or intermittently, turn ON Watch-It 20 to an active state to use 3D camera system 30 to image an environment of Watch-IT and process images acquired by the 3D camera system to determine if a user is in FOV 38 and facing Watch-It 20.

Optionally, Watch-It 20 comprises an accelerometer 42 and controller 40 turns ON Watch-It 20 to the active state when signals generated by accelerometer 42 responsive to movement of wrist 11 of user 10 indicates that the user has brought Watch-It 20 up to his or her face. In an embodiment of the invention, Watch-It 20 comprises an instruction set for implementing a classifier (not shown), which may comprise for example, a support vector machine, a regression machine, Bayesian engine, and/or a neural network, that determines if signals provided by accelerometer 42 indicate that the user has brought Watch-IT 20 up to the user's face. To make the determinations, the classifier may be taught to distinguish signals provided by the accelerometer that indicate movement of wrist 11 to bring Watch-It 20 up to the user's face from other movements of the hand, such as movements that indicate a normal swinging motion that may accompany walking.

Figure 2A:
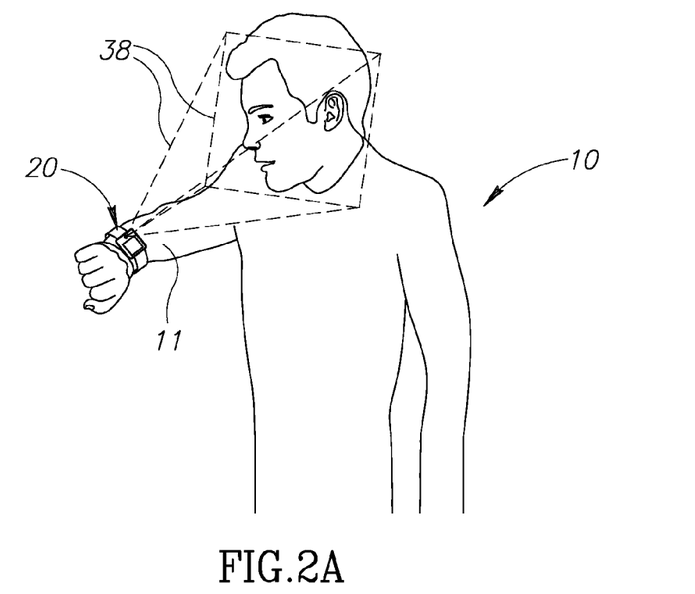
FIG. 2A schematically shows the user shown in FIG. 1A holding up Watch-It to his face so that Watch-It can identify the user, in accordance with an embodiment of the invention.

Upon being turned ON to the active state, for example responsive to user 10 bringing Watch-It 20 up to his or her face as schematically shown in FIG. 2A, controller 40 operates 3D camera system 30 to acquire 3D range images and picture images of a scene that is located in FOV 38 of the 3D camera system. Controller 40 processes the images of the scene to determine if the scene comprises an image of a user, and if so, processes the images to determine an identity of the user and if the user is watching Watch-It 20.

Figure 2B:
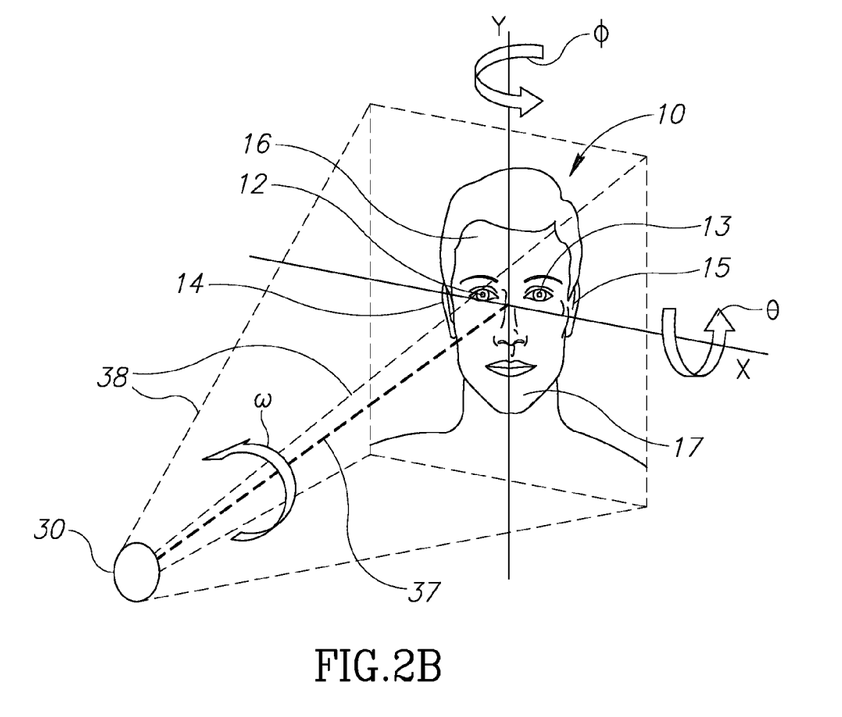
FIG. 2B schematically shows an enlarged view of the FOV of Watch-It and the face of the user shown in FIG. 2A and parameters used to determine head orientation of the user and whether the user is watching Watch-It, in accordance with an embodiment of the invention.

In an embodiment of the invention, controller 40 is controllable to configure dimensions of FOV 38 to desirable or advantageous dimensions for determining presence of a user in the FOV and/or for interfacing a user with, or via, Watch-It. For example, a depth of field (DOF), or a maximum imaging range of FOV 38 for which 3D camera system 30 images objects may be made smaller or larger to accommodate a distance at which user 10 finds it comfortable to interact with Watch-It 20. FOV 38 may be adjusted to limit extraneous features in a surrounding of user 10 from being imaged when user 10 is interacting with Watch-It 20. A solid angle of FOV 38 may similarly be made larger or smaller to accommodate a user. The solid angle may be made larger to accommodate a larger face, or smaller to limit imaging extraneous objects. A direction of the FOV may also be adjusted. For example, whereas a FOV of a camera system is generally symmetric with respect to an optic axis of the camera system, as schematically shown in FIG. 2B discussed below, FOV 38 may be adjusted in an embodiment of the invention so that it is not symmetric with respect to a direction of an optic axis of 3D camera system 30, but is skewed away from the direction of the optic axis. It may be desirable to skew the FOV to accommodate a preferred direction from which user 10 views Watch-It 20 when interacting with Watch-It. For wrist mounted Watch-It 20 a user may have a tendency to view Watch-It from a comfortable perspective that is angled with respect to the optic axis. Controller 40 may configure dimensions of FOV 38 so that it has a relatively small volume to provide Watch-It 20 and user 10 with a zone of privacy characterized by enhanced immunity to visual eavesdropping. FOV 38 for example, may have a cross section at a maximum imaging range of FOV 38 that is just sufficient to contain the users' face.

For 3D camera system 30 comprising a TOF-3D range camera, DOF, or a maximum imaging range of FOV 38 is optionally adjusted by adjusting timing and/or duration of exposure periods relative to transmission times and pulse widths of IR pulses transmitted by light source 35. Solid angle of FOV 38 may be adjusted by a suitable zoom lens system or by cropping images acquired by 3D camera system 30. Cropping may be performed by image processing images acquired by 3D camera system 30 and/or controlling sensitivity to light of pixels comprised in a photosensor on which light collected by the 3D camera system is imaged.

Controller 40 may determine presence of a user, such as user 10, in images of the scene imaged by determining if the images comprise an image of a human face responsive to processing the images in accordance with any of various pattern recognition algorithms or any combination of more than one of such pattern recognition algorithms. Controller 40 may for example comprise an executable instruction set for executing a "shape-based" and/or a "texture-based", algorithm configured to determine if the images comprise a human face.

A shape-based detection algorithm may comprise at least one classifier that is trained to recognize a shape of a human face by training the detection system to distinguish human face shapes in a set of 3D range and picture training images, some of which training images contain images of human faces and others of which do not. Optionally, the shape-based detection algorithm is a global shape-based detection system trained to detect a shape of a human face as a whole in the 3D range and picture images. Optionally, the shape-based detection algorithm is a component based shape-based detection algorithm. The component based detection system determines presence of an image of a human face in the 3D range and picture images by providing assessments provided by component classifiers as to whether components of a human face, such as eyes, ears, a nose and a mouth are present in the images. The assessments are then combined by a holistic classifier to provide a holistic assessment as to whether the images evidence a human face. The component and holistic classifiers may be trained on a suitable training set.

A texture-based classifier determines presence of a human face in the images responsive to spatial variations of intensity of picture images provided by the 3D camera system and/or spatial variations in distances to features in the scene in 3D range images. As in the case of the shape-based classifier, the texture-based classifier may be trained on a suitable training set of picture and 3D range images.

In an embodiment of the invention, upon determining the presence of a face in FOV 38, controller 40 processes the picture and 3D range images to determine orientation of the head of user 10 and whether the orientation is consistent with the user looking at Watch-It 20. In an embodiment of the invention, head orientation is used to determine a gaze direction for the user and to determine if the gaze direction indicates whether the user is looking at Watch-It 20. Optionally, orientation is referenced to an optic axis of 3D camera system 30 and may be determined responsive to 3D spatial coordinates of fiducial features of the user's head and face that are imaged in the images provided by 3D camera system 30. Fiducial features are features whose images and 3D spatial coordinates are advantageous for indicating orientation of the head, and may include features such as the forehead, eyes, nose, lips and chin, and the ears.

FIG. 2B schematically shows fiducial features of the head and face of user 10 shown in FIGS. 1A and 2A that may be used by Watch-It 20 for determining head orientation of the user and if the user is facing 3D camera system 30 and Watch-It 20. In FIG. 2B Watch-It's 3D camera system 30 is represented by a circle (in the perspective of the figure the circle appears an ellipse) labeled "30" and the figure shows an optic axis 37 of FOV 38 of the 3D camera system. The head and face of user 10 are located in FOV 38. Orientation of the head of user 10 may be defined by an azimuth angle ω, a tilt angle θ, and a yaw angle φ for rotations respectively about optic axis 37, and X and Y orthogonal axes that are perpendicular to the optic axis. Curved block arrows labeled ω, θ, and φ indicate azimuth, tilt, and yaw angles of rotation about optic axis 37, the X-axis, and the Y-axis respectively. 3D spatial coordinates for a combination of two or more fiducial features of user 10 such as, right and left ears 14 and 15, right and left eyes 12 and 13 respectively, the forehead 16, and chin 17 that are provided by 3D range images and/or picture images of the face and head of user 10 may be used to determine ω, θ, and φ and if the user is facing 3D camera system 30.

By way of a simple example, assume that user 10 has turned his head only about the Y axis. 3D spatial coordinates for right and left ears 14 and 15 and/or right and left eyes 12 and 13 may be used to determine angle of rotation φ. If the user's head is displaced only along the X-axis, an amount of displacement and φ determined from the 3D spatial coordinates may generally be sufficient to determine if user 10 is facing Watch-It 20. If there is displacement of the head also along the Y-axis, angle θ may also be advantageous in determining if user 10 is facing Watch-It 20. Similarly, tilt angle θ may be determined responsive to 3D spatial coordinates of forehead 16 and chin 17.

Whereas head orientation may be used in accordance with an embodiment of the invention to indicate whether user 10 is facing Watch-It 20, a user may be facing Watch-it 20 but directing his or her gaze elsewhere. In an embodiment of the invention Watch-It controller 40 processes images acquired by 3D camera system 30 to determine a gaze direction for a user imaged by 3D camera system 30 and determines if the gaze direction is directed to Watch-It 20 to determine if the user is attempting to use Watch-It 20.

In an embodiment of the invention, to determine gaze direction, controller 40 processes the images to locate and determine relative positions of reflections from a surface or surfaces of different structures of the eye that may be used to determine a gaze direction of the eye. Reflections from surfaces of structures of the eye are referred to conventionally as "Purkinje reflections". First, second, third, and fourth Purkinje reflections refer respectively to reflections from the front surface of the cornea, from the back surface of the cornea, the front surface of the lens and the back surface of the lens.

For a given stationary source of light, reflections from the front surface of the cornea, the first Purkinje reflection, are strongest and are conventionally referred to as "glints". Locations of images of glints in images of the eye acquired by a camera are relatively independent of direction of gaze of the eye for moderate eye rotations (eye rotations up to about ±15°) and a fixed position of the head and camera. Locations of images of glints may be used to reference motion of images of features of the eye or of other Purkinje reflections to determine a person's gaze direction. Optionally, controller 40 determines a gaze direction for an eye of a user, such as user 10 shown in FIG. 1A and FIG. 2A responsive to a head orientation of the user and location of an image of the eye's pupil relative to an image of a glint from the eye in images of the user acquired by 3D camera system 30. Optionally, head orientation is determined by controller 40 as described above.

Figure 3A:
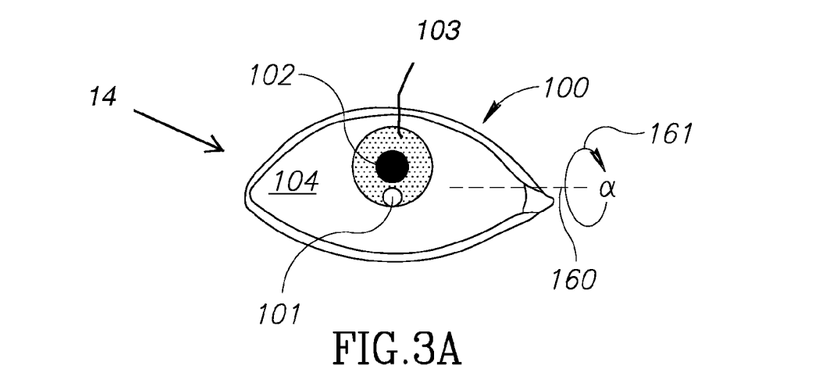
FIGS. 3A, 3B and 3C schematically illustrate how images of an eye of the user in images acquired by Watch-It's 3D camera system may be used to determine a gaze direction of the user and whether the user is looking at Watch-It, in accordance with an embodiment of the invention.
Figure 3B:
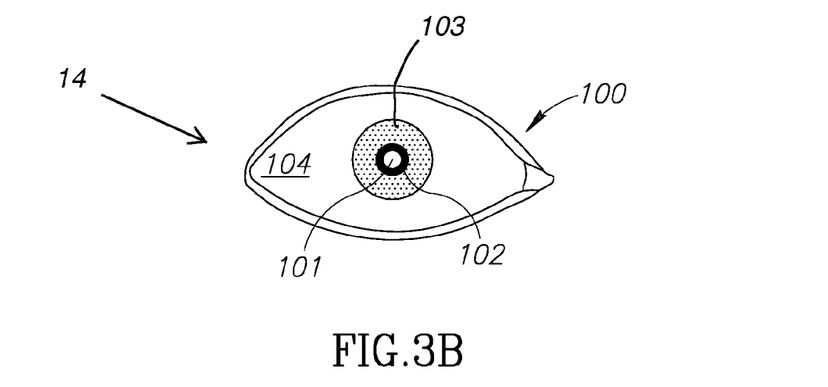
Figure 3C:
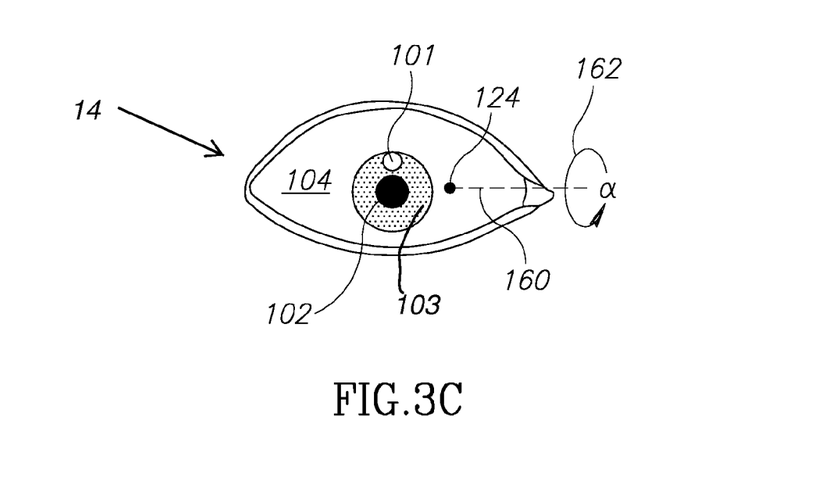

FIGS. 3A, 3B and 3C schematically illustrate for some very simple cases how position of a glint relative to a pupil of an eye may indicate a gaze direction for the eye. Each of the figures show schematic images of right eye 14 of user 10 and a glint 101, pupil 102, iris 103, and sclera 104 for the eye. In each of the figures eye 14 is oriented at a different angle about a horizontal axis 160 through a center of the eye. In FIG. 3B eye 12 is looking straight along optic axis 37 of 3D camera system 30 (FIG. 2B) and an optic axis (not shown) of the eye is aligned with optic axis 37. As a result, glint 101 is centered on an image of the eye's pupil 102. In FIG. 3A user 10 is looking "upwards" and has rotated eye 14 by an angle α in a direction indicated by circular arrow 161. As a result of which glint 101 is displaced downward relative to pupil 102. In FIG. 3C user 10 is looking "downwards" and has rotated eye 14 by an angle α in a direction indicated by circular arrow 162 that is opposite to the rotation indicated by circular arrow 161 in FIG. 3A. As a result glint 101 is displaced upwards relative to pupil 102. Distances between glint 101 and pupil 102 may be used to determine a magnitude for angle α

In response to determining that head orientation of user 10 indicates that user 10 is facing Watch-It 20 and/or in response to determining that the gaze direction of user 10 indicates that the user is looking at Watch-It, controller 40 may generate an indication on screen 22 (FIG. 1B, 2A) to alert user 10 that the user presence has been recognized. The indication may of course be any suitable graphic display, such as by way of example, a display of an eye, a face, or busy icon. Optionally, Watch-It 20 comprises a speaker and notifies user 10 that his presence has been noted by generating an audio alert. The controller may, after recognizing the user presence and optionally generating a visual and or audio response for the user, proceed to determine and identity for user 10 and if user 10 is authorized to access functionalities provided by Watch-IT 20 and/or a device accessible via Watch-It. For example, Watch-It 20 may comprise a database of confidential information and/or a library of APPs (applications), and/or support a communication service that Watch-It 20 makes available only if user 10 is an authorized user. And/or, Watch-It 20 may enable use of another device, such as a mobile phone, tablet, or laptop, that provides one or more functionalities, such as one or more of the example functionalities noted above, only if user 10 is an authorized user.

Watch-It 20 may determine an identity of user 10 by comparing data comprised in images of the user acquired by 3D camera system 30 to data comprised in a reference database (not shown) that is comprised in Watch-It 20 or a reference database to which Watch-It has access. Optionally, the database comprises data associated with 3D range and picture "reference images" of at least one authorized user. In an embodiment of the invention the reference images may comprise 3D range and picture images acquired, optionally by 3D camera system 30, of the at least one authorized user in a standard pose. A user standard pose may for example be a full, frontal face pose for which the user's head orientation angles ω, θ, and φ are all substantially equal to zero and the user's face is substantially centered in FOV 38 of 3D camera system 30 (FIG. 2B) when imaged by the 3D camera system. To compare data in 3D range and picture images of user 10 acquired by 3D camera system 30 to data in reference images, controller 40 optionally determines a transformation, for example an affine transformation, which transforms the images of user 10 to images oriented in the standard pose. The transformation is optionally determined responsive to 3D spatial coordinates provided by images of user 10 acquired by 3D camera system 30. Controller 40 transforms the images of user 10 to the standard pose and compares the transformed images to the reference images to determine if user 10 is an authorized user.

In an embodiment of the invention Watch-It 20 requires that user 10 voice speech comprising a password or passphrase, while 3D camera system 30 images user 10 in order to identify and authorize the user. Watch-It 20 may comprise a microphone (not shown) and optionally records a voiceprint of the user's speech using the microphone. Optionally, controller 40 processes the voiceprint to determine if the password or passphrase is present in the voiceprint. In an embodiment of the invention, controller 40 uses images of the user's lips, teeth and tongue comprised in 3D range images and picture images acquired by 3D camera system 30 during the user's voicing speech recorded in the voiceprint to lip-read the user. Controller 40 correlates lip-reading with the voiceprint to aid in identifying phonemes and thereby the password or passphrase that may have been voiced and recorded in the voiceprint.

Once authenticated, Watch-It 20 may interface user 10 to Watch-It 20 or a device interfaced by Watch-It 20 by voice using not only the microphone but lip-reading performed by controller 40 responsive to image processing 3D range images and/or picture images provided by 3D camera system 30. In an embodiment of the invention to facilitate lip reading of user 10, controller 40 may adjust the DOF or a maximum imaging range of FOV 38 optionally using methods discussed above, to constrain user 10 to position his mouth at an advantageous location relative to Watch-It 20 so that the user's lips, teeth, and tongue are advantageously imaged for lip-reading by 3D camera system. For example, controller 40 may control FOV 38 to constrain the user to keep his or her mouth within a range of distances, optionally from about 5 cm to about 50 cm, for which 3D camera system 30 is able to acquire images of the user's mouth having advantageous resolution. In an embodiment, controller 40 may cue user 10 to orient his head advantageously relative to optic axis 37 (FIG. 2B) to facilitate lip-reading. For example, controller 40 may determine yaw and tilt angles $\phi$ and $\theta$ respectively for the head of user 10, optionally as discussed above, and cue the user to adjust his head orientation to yaw and tilt angles advantageous for lip reading. Cueing user 10 may be accomplished by displaying suitable icons on screen 22 that change to indicate approach to or advantageous yaw and tilt angles. Similarly, controller 40 may determine distance of the mouth of user 10 from Watch-It 20 responsive to a range image acquired by 3D camera system 30, and cue user 10 to position his head to locate the mouth at a distance advantageous for lip-reading.

There is therefore provided in accordance with an embodiment of the invention, a computer interface configured to be worn by a user and interface the user with a computer, the interface comprising: a three dimensional (3D) camera system having an optic axis and a field of view (FOV), the 3D camera system comprising: a 3D range camera controllable to acquire a range image of a scene in the FOV that provides 3D spatial coordinates for features in the scene; and a picture camera controllable to acquire a picture image of the scene; and a controller that processes one or both of the images to determine if a user is imaged in the FOV and is looking at the interface and if so, an identity of the user, and if the identity is an identity of a user authorized to use the interface, the controller enables the user access to functionalities provided by the computer.

Optionally, the controller maintains the interface in a default state in which the 3D camera system is OFF. Optionally, the controller turns ON the 3D camera system periodically or intermittently to acquire the 3D range image and picture image. Additionally or alternatively, the interface may comprise an accelerometer that generates signals responsive to motion of the interface that the controller processes to determine if the user has moved the interface to position the user in the FOV. If the controller determines that the user has moved the interface to position the user in the FOV, the controller may turn ON the 3D camera system to acquire the 3D range image and picture image.

In an embodiment of the invention, to determine if the user is looking at the interface the controller processes at least one or both of the 3D range image and picture image to determine if the user's head is in the FOV.

In an embodiment of the invention, to determine if the user is looking at the interface the controller processes at least one or both of the 3D range image and picture image to determine orientation of the user's head. To determine if the user is looking at the interface, in accordance with an embodiment of the invention, the controller processes at least one or both of the 3D range image and picture image to identify an image of an eye of the user and a direction of gaze of the eye responsive to the image.

In an embodiment of the invention, the interface comprises or has access to a database having data associated with a reference image of at least one authorized user, and the controller compares data associated with the reference image to data associated with at least one or both of the 3D range image and picture image to determine an identity for the user and if the determined identity is an identity of an authorized user. Optionally, the reference image of an authorized user is an image of the authorized user in a standard pose. Optionally, the standard pose is a full frontal face pose in which the user is looking substantially directly along an optical axis of a camera acquiring the reference image. The controller may apply a transform to at least one of the 3D range image and picture image to transform the image to the standard pose to determine the identity of the user. The controller may determine the transform responsive to the 3D range image.

In an embodiment of the invention, the interface comprises a microphone and the controller controls the microphone to acquire a voice print of speech vocalized by the user while controlling the 3D camera system to acquire 3D range and picture images of the user's mouth vocalizing the speech. Optionally, the controller processes the images of the user's mouth to lip-read the user and correlate the lip-reading with the voiceprint to identify words in the voiceprint.

The controller may process images provided by the 3D camera system to make a determination of at least one or any combination of more than one of distance of the user's mouth from the interface, tilt, yaw and azimuth angles of the user's head relative to the optic axis, and may use the determination to cue the user to locate the mouth in the FOV at a location advantageous for lip-reading.

In an embodiment of the invention, the controller controls at least one of or a combination of two or more of a solid angle, a depth of field, and a maximum imaging range of the FOV to provide a desired size of the FOV.

In an embodiment of the invention, the controller controls direction of the FOV relative to the optical axis to provide a desired imaging direction for the 3D camera system.

The interface may be a wrist worn interface. The interface may be worn on a leg of the user.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to users of the art. The scope of the invention is limited only by the claims.

The invention claimed is:

1. A computer interface configured to be worn by a user and interface the user with a computer, the interface comprising:
   a three dimensional (3D) camera system having an optic axis and a field of view (FOV), the 3D camera system comprising:
      a 3D range camera controllable to acquire a range image of a scene in the FOV that provides 3D spatial coordinates for features in the scene; and
      a picture camera controllable to acquire a picture image of the scene; and
   a controller that processes one or both of the images to determine if a user is imaged in the FOV and is looking at the interface and if so, an identity of the user, and if the identity is an identity of a user authorized to use the interface, the controller enables the user access to functionalities provided by the computer, and wherein, 1) the controller maintains the interface in a default state in which the 3D camera system is OFF; and, 2) the controller turns ON the 3D camera system periodically or intermittently to acquire the 3D range image and picture image.

2. The computer interface according to claim 1 wherein the interface comprises an accelerometer that generates signals responsive to motion of the interface that the controller processes to determine if the user has moved the interface to position the user in the FOV.

3. The computer interface according to claim 2 wherein if the controller determines that the user has moved the interface to position the user in the FOV, the controller turns ON the 3D camera system to acquire the 3D range image and picture image.

4. The computer interface according to claim 1 wherein to determine if the user is looking at the interface the controller processes at least one or both of the 3D range image and picture image to determine if the user's head is in the FOV.

5. The computer interface according to claim 1 wherein to determine if the user is looking at the interface the controller processes at least one or both of the 3D range image and picture image to determine orientation of the user's head.

6. The computer interface according to claim 1 wherein to determine if the user is looking at the interface the controller processes at least one or both of the 3D range image and picture image to identify an image of an eye of the user and a direction of gaze of the eye responsive to the image.

7. The computer interface according to claim 1 wherein the interface comprises or has access to a database having data associated with a reference image of at least one authorized user, and the controller compares data associated with the reference image to data associated with at least one or both of the 3D range image and picture image to determine an identity for the user and if the determined identity is an identity of an authorized user.

8. The computer interface according to claim 7 wherein the reference image of an authorized user is an image of the authorized user in a standard pose.

9. The computer interface according to claim 8 wherein the standard pose is a full frontal face pose in which the user is looking substantially directly along an optical axis of a camera acquiring the reference image.

10. The computer interface according to claim 7 wherein the controller applies a transform to at least one of the 3D range image and picture image to transform the image to the standard pose to determine the identity of the user.

11. The computer interface according to claim 10 wherein the controller determines the transform responsive to the 3D range image.

12. The computer interface according to claim 1 wherein the interface comprises a microphone and the controller controls the microphone to acquire a voice print of speech vocalized by the user while controlling the 3D camera system to acquire 3D range and picture images of the user's mouth vocalizing the speech.

13. The computer interface according to claim 12 wherein the controller processes the images of the user's mouth to lip-read the user and correlate the lip-reading with the voiceprint to identify words in the voiceprint.

14. The computer interface according to claim 13 wherein the controller processes images provided by the 3D camera system to make a determination of at least one or any combination of more than one of distance of the user's mouth from the interface, tilt, yaw and azimuth angles of the user's head relative to the optic axis, and uses the determination to cue the user to locate the mouth in the FOV at a location advantageous for lip-reading.

15. The computer interface according to claim 1 wherein the controller controls at least one of or a combination of two or more of a solid angle, a depth of field, and a maximum imaging range of the FOV to provide a desired size of the FOV.

16. The computer interface according to claim 1 wherein the controller controls direction of the FOV relative to the optical axis to provide a desired imaging direction for the 3D camera system.

17. The computer interface according to claim 1 wherein the interface is a wrist worn interface.

18. The computer interface according to claim 1 wherein the interface is worn on a leg of the user.

19. A computer interface configured to be worn by a user and interface the user with a computer, the interface comprising:
   a three dimensional (3D) camera system having an optic axis and a field of view (FOV), the 3D camera system comprising:
      a 3D range camera controllable to acquire a range image of a scene in the FOV that provides 3D spatial coordinates for features in the scene; and
      a picture camera controllable to acquire a picture image of the scene; and
   a controller that processes one or both of the images to determine if a user is imaged in the FOV and is looking at the interface and if so, an identity of the user, and if the identity is an identity of a user authorized to use the interface, the controller enables the user access to functionalities provided by the computer, and the interface comprises an accelerometer that generates signals responsive to motion of the interface that the controller processes to determine if the user has moved the interface to position the user in the FOV, wherein the controller maintains the interface in a default state in which the 3D camera system is OFF, and if the controller determines that the user has moved the interface to position the user in the FOV, the controller turns ON the 3D camera system to acquire the 3D range image and picture image.

20. A computer interface configured to be worn by a user and interface the user with a computer, the interface comprising:
- a three dimensional (3D) camera system having an optic axis and a field of view (FOV), the 3D camera system comprising:
  - a 3D range camera controllable to acquire a range image of a scene in the FOV that provides 3D spatial coordinates for features in the scene; and
  - a picture camera controllable to acquire a picture image of the scene;
- a controller that processes one or both of the images to determine if a user is imaged in the FOV and is looking at the interface and if so, an identity of the user, and if the identity is an identity of a user authorized to use the interface, the controller enables the user access to functionalities provided by the computer, and the interface comprises an accelerometer that generates signals responsive to motion of the interface that the controller processes to determine if the user has moved the interface to position the user in the FOV; and,
- a microphone,
- wherein, the controller controls the microphone to acquire a voice print of speech vocalized by the user while controlling the 3D camera system to acquire 3D range and picture images of the user's mouth vocalizing the speech, the controller processes the images of the user's mouth to lip-read the user and correlate the lip-reading with the voiceprint to identify words in the voiceprint, and, the controller processes images provided by the 3D camera system to make a determination of at least one or any combination of more than one of distance of the user's mouth from the interface, tilt, yaw and azimuth angles of the user's head relative to the optic axis, and uses the determination to cue the user to locate the mouth in the FOV at a location advantageous for lip-reading.

* * * * *